US011193539B2

(12) United States Patent
Friedrich et al.

(10) Patent No.: US 11,193,539 B2
(45) Date of Patent: Dec. 7, 2021

(54) BEARING CAGE SEGMENT INCLUDING AT LEAST ONE RECESS FOR FACILITATED BENDING

(71) Applicant: AKTIEBOLAGET SKF, Gothenburg (SE)

(72) Inventors: Hans-Juergen Friedrich, Königsberg-Römershofen (DE); Norbert Huhn, Schweinfurt (DE); Thomas Kettner, Bamberg (DE); Manfred Mattes, Kolbingen (DE); Harald Metz, Randersacker (DE); Achim Mueller, Dittelbrunn (DE); Alfred Radina, Poppenlauer (DE); Jonas Schierling, Hassfurt (DE); Maximilian Soellner, Bundorf (DE); Markus Volkmuth, Werneck-Zeuzleben (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/780,099

(22) Filed: Feb. 3, 2020

(65) Prior Publication Data

US 2020/0256392 A1   Aug. 13, 2020

(30) Foreign Application Priority Data

Feb. 7, 2019   (DE) ........................ 102019201564.6

(51) Int. Cl.
*F16C 33/50*   (2006.01)
*F16C 33/54*   (2006.01)
*F16C 19/46*   (2006.01)

(52) U.S. Cl.
CPC .......... *F16C 33/543* (2013.01); *F16C 19/463* (2013.01); *F16C 2220/42* (2013.01); *F16C 2220/84* (2013.01)

(58) Field of Classification Search
CPC .... F16C 33/502; F16C 33/504; F16C 33/543; F16C 33/546; F16C 33/547; F16C 2220/42; F16C 2220/84; B21D 53/12
See application file for complete search history.

(56) References Cited

U.S. PATENT DOCUMENTS 3,992,764 A * 11/1976 Serasio ................. B21D 53/12
                                                                  29/898.067
9,382,947 B2      7/2016 Ishibashi

FOREIGN PATENT DOCUMENTS

| DE | 102012221097 A1 * | 5/2014 | ............ B21D 53/12 |
| DE | 102015210924 A1 * | 7/2016 | ......... F16C 33/4682 |
| JP | 08270658 A * | 10/1996 | .............. F16C 33/48 |
| JP | 2005076697 A * | 3/2005 | ............ F16C 33/516 |
| JP | 2008215615 A * | 9/2008 | ............ F16F 9/0245 |

* cited by examiner

*Primary Examiner* — Phillip A Johnson
(74) *Attorney, Agent, or Firm* — J-Tek Law PLLC; Scott T. Wakeman; Mark A. Ussai

(57) ABSTRACT

A sheet-metal bearing cage segment has a first ring section, at least one second ring section and a plurality of bridges connecting the first ring section and the at least one second ring section to each other such that a pocket for receiving at least one rolling element is formed between each circumferentially adjacent pair of the bridges. The first and/or second ring section includes at least one recess on the radially inner side and/or the radially outer side.

17 Claims, 3 Drawing Sheets

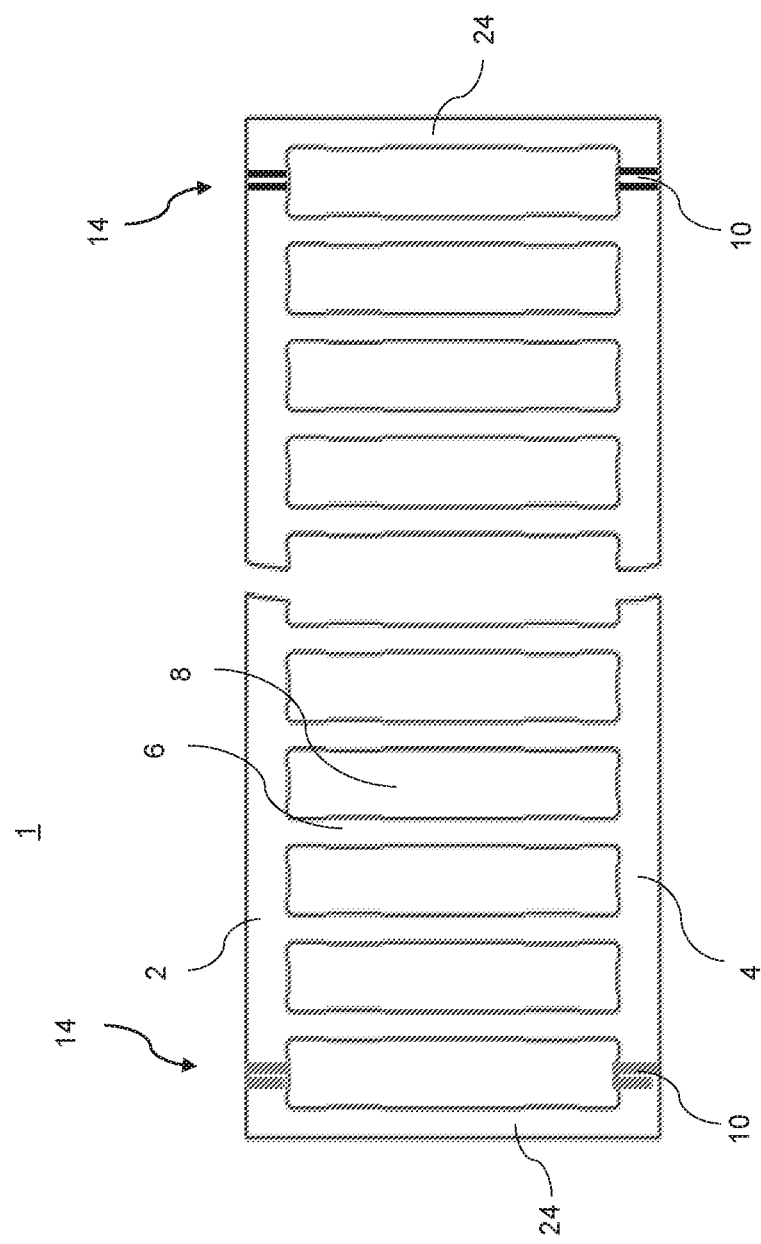

BEARING CAGE SEGMENT INCLUDING AT LEAST ONE RECESS FOR FACILITATED BENDING

CROSS-REFERENCE

This application claims priority to German patent application no. 10 2019 201 564.6 filed on Feb. 7, 2019, the contents of which are fully incorporated herein by reference.

TECHNOLOGICAL FIELD

The present disclosure is directed to a bearing cage segment of a sheet metal cage configured for improved calibration and to a sheet metal cage including such a bearing cage segment.

BACKGROUND

Bearing cages are known from the prior art that are composed of one or more rounded cage segments, made of sheet metal, that are respectively connected to one another at their joint edges, for example by welding.

Here it is known to produce the structure and contour of such bearing cage segments by punching and stamping. For this purpose in a first step a metal band is intermittently moved along in the longitudinal direction, wherein transversely extending slots are formed by a punch press. In a further step the metal band is cut to length using a transverse cutting device so that a ladder-shaped sheet metal part is formed, wherein the "rungs" of this part form bridges of the bearing cage segment, the slots of the part form pockets of the bearing cage segment, and the "side rails" of the part form the ring sections of the bearing cage segment. In a subsequent step the ring sections are then bent to the desired radius of curvature by round-shaping.

The round-shaping of the bearing cage segment into the desired curved shape is typically effected automatically. In the case of large quantities, it is known to provide an additional automated calibration process after the bending and welding. With small quantities a calibration step is carried out, for example, using a hydraulic press.

During calibration the ring sections of the sheet metal cage are usually compressed or expanded again in the radial direction by segmented multislide tools using a hydraulic press, whereby an improved roundness of the ring sections of the sheet metal cage is generated by plastic deformation.

Alternatively the calibration can be effected by a die, wherein the cage is pressed over or by a correspondingly shaping, roundness-improving die.

The performance of the finished bearing cage depends significantly on the quality of the round-shaping. According to the prior art, the desired curvature is only ensured or achieved by the mentioned additional calibration process. If this calibration process is carried out automatically, it requires a separate machine that must be correspondingly loaded. A calibration using a hydraulic press is associated with considerable expense. In each case the calibration process thus requires expense and time.

SUMMARY

It is therefore an aspect of the present disclosure to provide a bearing cage segment of a sheet metal cage that can be manufactured at reduced expense.

In the following a bearing cage segment of a sheet metal cage, in particular for a needle roller bearing, is provided, which includes a first ring section, at least one second ring section, and a plurality of bridges connecting the first ring section and the at least one second ring section to each other, wherein a pocket for receiving at least one rolling element is respectively formed between the bridges. Here the disclosure is based on the idea that the first ring section and/or the at least one second ring section includes at least one recess on the radially inner and/or the radially outer side. Due to the at least one recess the bearing cage segment can be bent more easily into the radius of curvature provided for the sheet metal cage. In particular, in this way a precisely defined bending can be achieved with the application of a defined bending force, so that the desired round-bending of the cage is automatically set. A subsequent calibration process can consequently be omitted. The manufacturing is therefore made easier.

Here the bearing cage segment can be configured for single-row or multi-row bearing cages.

Furthermore the at least one recess is preferably produced via a shaping process in which no material is removed. However, alternatively it can also be formed by a material-removing processing, such as, for example, a milling.

If the at least one recess is formed between two bridges, the respective ring section can be made particularly flexible for the bending process in the region between these bridges, in particular more flexible than in the regions, adjacent to this region, at which the bridges are connected to the ring section. Thus during the bending process the ring section can be bent more strongly in the region between the bridges than in the adjacent regions. In this way the deformations in the adjacent regions, i.e., the bridge regions, which deformations are caused by the bending, remain particularly small.

Furthermore it is achieved in this way that the pocket formed between the respective bridges has a particularly large width, measured in the circumferential direction, on its radially outer side in comparison to its radially inner side. By corresponding dimensioning and design of the recess, taking into account the thickness of the metal sheet used for manufacturing, it can therefore be effected that due to the applied bending force the radially inner and the radially outer width of the pocket are dimensioned such that a corresponding rolling element, for example, in the form of a needle, can be introduced into this pocket specifically from radially outward, but cannot fall out of the pocket radially inwardly. In this way guide surfaces for the rolling element or the needle do not need to be formed by punching or stamping, or the like.

A particularly uniform round-bending of the bearing cage segment into the desired radius of curvature provided for the sheet metal cage is made possible if the first ring section and/or the at least one ring section each include a plurality of recesses, since a bending at the respective point is made easier by each of the recesses. Accordingly the bearing cage segment can be bent particularly uniformly overall if the recesses are equidistantly spaced in the circumferential direction. It is therefore particularly preferred that at least one recess be formed between each bridge in the circumferential direction.

Here the plurality of recesses can advantageously be configured identically. The manufacturing is thus further facilitated.

According to one exemplary embodiment, the bearing cage segment includes an end region at each of its circumferential ends at which the at least one recess is formed at least on one of the end regions of the bearing cage segment. During the round-bending of the bearing cage segment into the provided radius of curvature, due to the lever ratios the end regions can bend with more difficulty than a central region of the bearing cage segment. The round-bending of the bearing cage segment is therefore made easier overall if the at least one recess is formed on at least one end region of the bearing cage segment. During calibration, as is provided in the prior art mentioned above, it is the end regions in particular that must be post-processed. Despite the omission of the calibration, good results can be achieved because of the recesses provided at the end regions.

A size of the recess particularly suitable for the function can be achieved when the at least one recess has a radial depth x for which the following applies: $0.2\ d \le x \le 0.5\ d$, wherein d is the thickness of the corresponding ring section. In particular it can be achieved in this way that the desired bending is achieved, but on the other hand sufficient stability of the respective ring section remains ensured. The depth of the recess is selected in a manner depending on the bending force for a certain curvature.

A shape of the at least one recess that is particularly suitable for the mentioned function can be achieved when the at least one recess is shaped such that it has a radius of curvature r that is selected such that the following applies: $0.25\ d \le r \le d$, preferably $0.25\ d \le r \le 0.5\ d$, wherein d is the thickness of the corresponding ring section.

According to one exemplary embodiment the at least one recess is formed as an axially continuous groove through the respective ring section. Since the round-bending of the bearing cage segment is effected about an axis that extends in the axial direction, the round-bending is particularly facilitated by the recess configured this way.

According to one preferred exemplary embodiment the at least one recess is stamped. A stamping can be carried out easily and rapidly so that in this way the production of the at least one recess is particularly advantageously made possible.

According to one exemplary embodiment both the first ring section and the at least one second ring section include at least one recess on the radially inner and/or the radially outer side. In this way the first ring sections can be bent particularly suitably in the same way as the at least one second ring section, in particular when the at least one recess of the first ring section and the at least one recess of the at least one second ring section are aligned in the axial direction.

As mentioned above, the at least one recess can be formed between two bridges, but a facilitated round-bending of the bearing cage segment can in principle also be achieved when the at least one recess is formed at the location of a bridge.

According to a further aspect of the disclosure a sheet metal cage is provided, in particular for a needle roller bearing, that includes at least one above-described bearing cage segment. The sheet metal cage can be configured single-row or multi-row.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWINGS

FIG. 4 is a schematic representation of a further exemplary embodiment having an alternative design of an end region of the bearing cage segment.

DETAILED DESCRIPTION

In the following, identical or functionally equivalent elements are designated by the same reference numbers. The direction designations used in the following—axial, radial, circumferential—always refer to the finished bearing cage.

Figure 1:
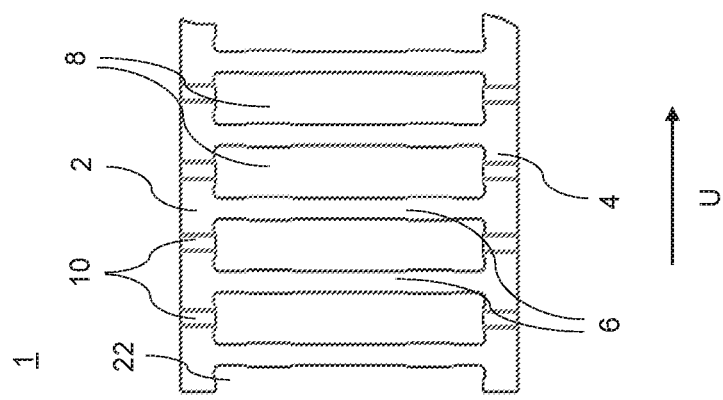
FIG. 1 is a schematic representation of an end section of a bearing cage segment according to an exemplary embodiment.

FIG. 1 shows a schematic representation of an end region of a first exemplary embodiment of a bearing cage segment 1. The bearing cage segment 1 includes a first ring section 2 and a second ring section 4. Bridges 6 that connect the ring sections 2, 4 to each other extend between the ring sections 2, 4, wherein a pocket 8 is respectively formed between the bridges 6, which pocket 8 is configured for receiving at least one rolling element (not shown).

Instead of the single-row design of the bearing cage segment 1 depicted here, the bearing cage segment 1 can also be configured multi-row, and would then include a first, a second, and further ring sections that are each connected to each other by bridges.

Figure 3:
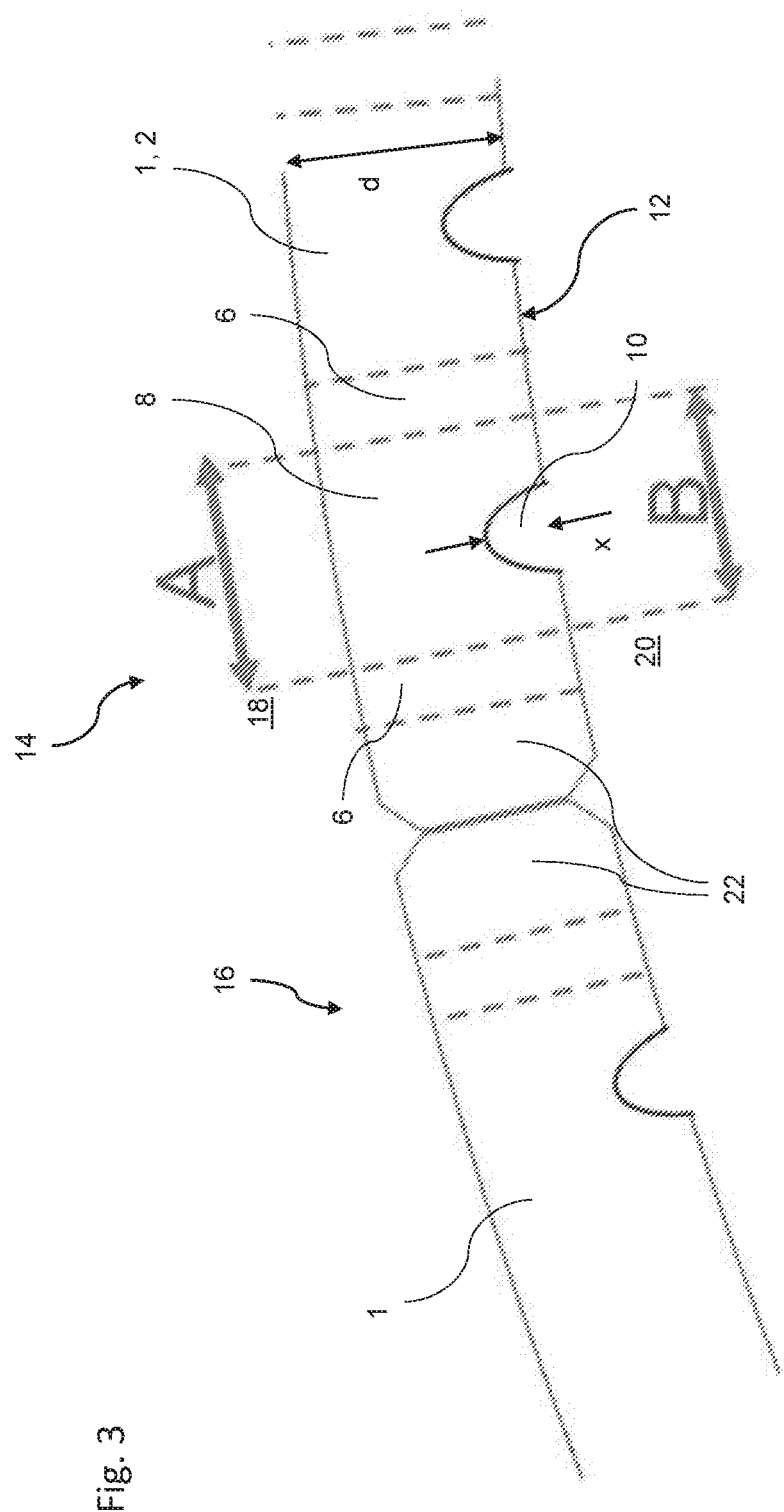
FIG. 3 is a cross-sectional view of a part of a ring section of the bearing cage segment including recesses for facilitated bending into a desired radius of curvature.

Furthermore it is schematically depicted in FIG. 1 that recesses or cutouts 10 are respectively provided on the first and second ring section 2, 4 in the region of the pockets 8. These recesses 10 can be formed on a radial outer surface and/or, as also depicted in FIG. 3, on a radial inner surface 12 of the bearing cage segment 1. The recesses 10 serve to facilitate the bending of the bearing cage segment 1 to its desired radius of curvature.

As depicted in FIG. 1, the recess 10 can respectively preferably be formed centrally in the circumferential direction in the region of the pockets 8. However, it is also possible to form the recess 10 at other locations, for example, in the region of the bridge 6. It is also possible that the recess 10 is not provided on each pocket 8 and/or on each ring section 2, 4.

Figure 2:
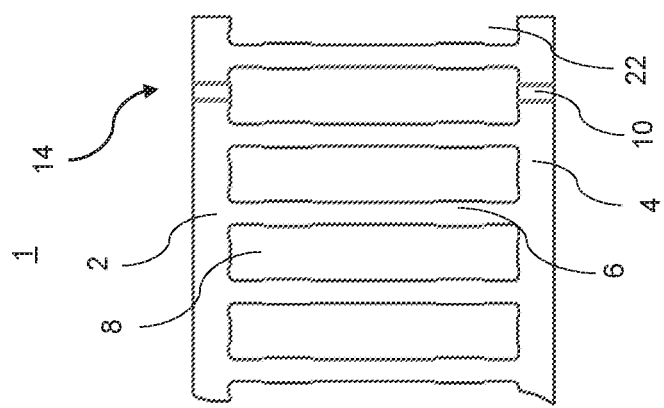
FIG. 2 is a schematic representation of a further exemplary embodiment, wherein recesses are formed only on an end region of the bearing cage segment.

Thus, for example, as shown in FIG. 2, the recess can be formed only in the end region 14 of the bearing cage segment 1 between the "next-to-last" bridge 6 and the "last" bridge 6.

Of course the other end section (not shown) of the bearing cage segment 1 can be configured analogously here.

According to a further exemplary embodiment not shown separately in the Figures, it can also be provided that recesses 10 are provided in the end region 14 at more, for example, two or three, pockets, wherein no further recesses are formed in the central region of the bearing cage segment 1.

FIG. 3 schematically shows a representation of a cross-section through the first or second ring section 2, 4 in the region of the recesses 10. The ring section 2, 4 has a thickness d in the radial direction.

As further depicted in FIG. 3, the recess 10 has a radial depth x. It is preferably between 20% and 50% of the thickness d of the ring section 2, 4. Thus on the one hand the facilitated bending is made possible, on the other hand a sufficient stability for the ring section 2, 4 is maintained in this way. Furthermore the recess 10 is configured curved and has a radius of curvature r, for which preferably $0.25\ d \leq r \leq d$, in particular $0.25\ d \leq r \leq 0.5\ d$, applies. These dimensions allow a precisely defined bending with the application of a defined bending force, so that the desired round-bending of the cage is automatically set. A subsequent calibration step can thus be omitted.

Furthermore, in the example shown here the recess 10 is configured as a groove that extends continuously in the axial direction through the ring section 2, 4. The desired bending is also facilitated thereby.

It is advantageous for a particularly simple manufacturing of the bearing cage segment 1 when the recess 10 is stamped. This usually occurs prior to all outer-contour-bending steps in order to remove any material accumulations without post-treatment.

As further outlined in FIG. 3, the bearing cage segment 1 is connected at its end section 14 to an end section 16 of a further bearing cage segment 1', wherein the bearing cage segment 1' can be the same bearing cage segment 1 or a further bearing cage segment 1' of the sheet metal cage. In this way the sheet metal cage can be formed from the bearing cage segment or a plurality of corresponding bearing cage segments.

As can also be seen from FIG. 3, providing the recess 10 makes possible during the round-bending of the cage that the width A of the pocket 8 measured in the circumferential direction on the radially outer side 8 is larger than the width B of this pocket 8 on its radially inner side 20.

In this way it can be effected that rolling elements received in the pocket 8 can be introduced into the pocket 8 from radially outward, but cannot fall out from the pocket 8 radially inwardly. Additionally formed guiding and retaining structures can thus be omitted.

In the examples outlined in FIGS. 1 and 2, "partial pockets" 22 are respectively formed on the end regions 14 of the bearing cage segment 1, which "partial pockets" 22, as can be seen from FIG. 3, from a "connection pocket" by a corresponding connecting of two such end sections. In the example shown, this connecting pocket does not include a corresponding recess. This is advantageous with respect to the stability of the connection, which can be, for example, a weld connection.

An alternative design for this purpose is shown in FIG. 4 on the basis of a further exemplary embodiment. Here "partial bridges" 24 are formed on the left end section 14 and on the right end section of the bearing cage segment 1. In this case at least one recess 10 is provided in the pocket delimited by the partial bridge 24, which recess 10 ensures that a sufficient curvature is achieved without too great a radial loading of the weld point (connection point) in the bridge region.

Overall a bending of the bearing cage segment to the radius of curvature provided for the finished bearing cage can be facilitated by the recess provided on the first and/or on the at least one second ring section of a bearing cage segment. Here the recesses can be provided in particular on the end sections of the ring regions, or uniformly distributed over the ring sections. In particular, in this way a precisely defined bending can be achieved with the application of a defined bending force, so that the desired round-bending of the cage is automatically set. A subsequent calibration process can consequently be omitted.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages segments and cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing cage segment
1' Further bearing cage segment
2 First ring section
4 Second ring section
6 Bridges
8 Pockets
10 Recesses
12 Radially inner surface
14 End region
16 Further end region
18 Radially outer side
20 Radially inner side
22 Partial pocket
24 Partial bridge

What is claimed is:

1. A sheet-metal bearing cage segment comprising:
a first sheet metal ring section,
at least one second sheet metal ring section,
a plurality of bridges connecting the first ring section and the at least one second ring section to each other such that a pocket for receiving at least one rolling element is formed between each circumferentially adjacent pair of the bridges,
wherein the first ring section and/or the at least one second ring section includes at least one recess on a radially inner side and/or a radially outer side,
wherein the segment includes a first end region at a first circumferential end of the segment and a second end region at a second circumferential end of the segment, and
wherein the at least one recess is formed on the first end region or on the second end region.

2. The bearing cage segment according to claim 1, wherein one of the at least one recess is formed between one of the circumferentially adjacent pairs of the bridges.

3. The bearing cage segment according to claim 1,
wherein the at least one recess comprises a first plurality of recesses on the first ring section and a second plurality of recesses on the at least one second ring section, and
wherein one of the first plurality of recesses is located between one of the circumferentially adjacent pairs of the bridges on the first ring section and one of the second plurality of recesses is located between one of the circumferentially adjacent pairs of the bridges on the at least one second ring section.

4. The bearing cage segment according to claim 3, wherein the first plurality of recesses on the first ring section are equidistantly spaced.

5. The bearing cage segment according to claim 1,
wherein the first ring section and the at least one second ring section each include the at least one recess, and
wherein the at least one recess on the first ring section extends across the first ring section as an axially continuous groove and/or the at least one recess on the second ring section extends across the second ring section as an axially continuous groove.

6. The bearing cage segment according to claim 1, wherein the at least one recess on the first ring section is stamped.

7. The bearing cage segment according to claim 1,
wherein the first ring section and the at least one second ring section each include the at least one recess, and
wherein the at least one recess of the first ring section and the at least one recess of the at least one second ring section are aligned in an axial direction.

8. A sheet metal cage for a needle roller bearing, including at least one bearing cage segment according to claim 1.

9. The bearing cage segment according to claim 1 configured as a needle roller bearing cage segment.

10. The bearing cage according to claim 1,
wherein the first ring section and the at least one second ring section each include the at least one recess,
wherein the at least one recess on the first ring section comprises a first plurality of equidistantly spaced recesses in the first ring section and the at least one recess on the at least one second ring section comprises a second plurality of equidistantly recesses in the at least one second ring section,
wherein each of the first and second plurality of recesses comprises an axially extending groove located between circumferentially adjacent pairs of the bridges,
wherein the first and second plurality of recesses have a radial depth x such that $0.2\,d \le x \le 0.5\,d$ and a radius of curvature r such that $0.25\,d \le r \le d$, where d is a thickness of the first ring section, and
wherein the first plurality of recesses is axially aligned with the second plurality of recesses.

11. The bearing cage according to claim 1,
wherein the at least one recess on the first ring section has a radial depth x such that $0.2\,d \le x \le 0.5\,d$, where d is a thickness of the first ring section.

12. The bearing cage according to claim 1,
wherein the at least one recess on the first ring section has a radius of curvature r such that $0.25\,d \le r \le d$, where d is a thickness of the first ring section.

13. The bearing cage according to claim 1,
wherein the at least one recess on the first ring section has a radius of curvature r such that $0.25\,d \le r \le 0.5d$, where d is a thickness of the first ring section.

14. The bearing cage segment according to claim 1,
wherein each of the at least one recess on the first ring section extends axially from one of the pockets to an axially outer edge of the first ring section.

15. A sheet-metal bearing cage segment comprising:
a first sheet metal ring section,
at least one second sheet metal ring section, and
a plurality of bridges connecting the first ring section and the at least one second ring section to each other such that a pocket for receiving at least one rolling element is formed between each circumferentially adjacent pair of the bridges,
wherein the first ring section and/or the at least one second ring section includes at least one recess on the radially inner side and/or the radially outer side, and
wherein the at least one recess has a radial depth x such that $0.2\,d \le x \le 0.5\,d$, where d is a thickness of the first ring section.

16. A sheet-metal bearing cage segment comprising:
a first sheet metal ring section,
at least one second sheet metal ring section, and
a plurality of bridges connecting the first ring section and the at least one second ring section to each other such that a pocket for receiving at least one rolling element is formed between each circumferentially adjacent pair of the bridges,
wherein the first ring section and/or the at least one second ring section includes at least one recess on the radially inner side and/or the radially outer side, and
wherein the at least one recess has a radius of curvature r such that $0.25\,d \le r \le d$, where d is a thickness of the first ring section.

17. The bearing cage segment according to claim 16, wherein the at least one recess has a radius of curvature r such that $0.25\,d \le r \le 0.5d$.

* * * * *